United States Patent [19]
Davies

[11] Patent Number: 5,965,688
[45] Date of Patent: Oct. 12, 1999

[54] INTERFACIAL POLYCARBONATE POLYMERIZATION PROCESS AND PRODUCT

[75] Inventor: Jackie D. Davies, Mt. Vernon, Ind.

[73] Assignee: General Electric Company, Pittsfield, Mass.

[21] Appl. No.: 08/989,259

[22] Filed: Dec. 12, 1997

[51] Int. Cl.[6] .................................................. C08G 64/00
[52] U.S. Cl. ............................................................ 528/196
[58] Field of Search ............................................. 528/196

[56] References Cited

U.S. PATENT DOCUMENTS

| | | | |
|---|---|---|---|
| 3,625,877 | 12/1971 | Jackson, Jr. et al. | 528/196 |
| 4,619,976 | 10/1986 | Morris et al. | 528/196 |
| 4,950,736 | 8/1990 | Sasaki et al. | 528/370 |
| 5,115,081 | 5/1992 | Masumoto | 528/196 |
| 5,288,836 | 2/1994 | Mychajlowski et al. | 528/198 |

FOREIGN PATENT DOCUMENTS

| | | |
|---|---|---|
| 1314023 | 5/1963 | France . |

OTHER PUBLICATIONS

W.H. Daly and B.R. Hahn: "Synthesis of Istropic Materials", Polymer Preprints, American Chemical Society, Division of Polymer Chemistry, vol. 30, No. 1, Apr. 1989, pp. 337–338, XP002098109, p. 338, results and discussion.

European Search Report on Application Number EP 98 30 9743.

Aliphatic–Aromatic Copolycarbonates Derived from 2,2,2,4–Tetramethyl–1,3–cyclobutaneodiol, by Carey Cecil Geiger, Jack D. Davies, and William H. Daly, Journal of Polymer Science: Part A: Polymer Chemistry, vol. 33, 2317–2327 (1995).

*Primary Examiner*—Terressa Mosley

[57] ABSTRACT

A process for preparing an aromatic carbonate polymer by an interfacial polymerization reaction by first forming an aliphatic chloroformate and then reacting the bischloroformate with a dihydroxy phenol such as bisphenol-A. The resulting polymer consists of alternating units of the reaction residue of the dihydroxy phenol and the aliphatic chloroformate.

16 Claims, No Drawings

INTERFACIAL POLYCARBONATE POLYMERIZATION PROCESS AND PRODUCT

FIELD OF INVENTION

The present invention relates to a carbonate copolymer and a process for preparing an aromatic carbonate copolymer by employing an interfacial polymerization reaction utilizing an aliphatic diol monomer prepared prior to the interfacial polymerization reaction thereof with an aromatic dihydroxy compound. The resulting copolymer incorporates the aliphatic diol in the polymer chain. The copolymer consists of alternating units of the residue of the reaction of the aromatic dihydroxy compound and the aliphatic diol.

BACKGROUND OF THE INVENTION

It is known to prepare polymers from certain cyclobutanediols and aromatic dihydroxy compounds such as 2,2-bis(4-hydroxyphenyl)propane, commonly referred as bisphenol-A (BPA). The polymers prepared therefrom employ solvents and high temperatures. U.S. Pat. Nos. 3,326,855; 3,313,777; 3,546,331; 3,546,332; 3,541,200; 3,375,210 and 3,674,623 disclose polymers prepared from tetrahalobutanediol and particularly tetramethylcyclobutanediol (TMCBD). As disclosed therein, TMCBD, for example, can be reacted with other reactants such as aryl dihydroxy compounds usually at elevated temperatures and in the presence of organic solvents. Several of the references are also directed to methods of surface crystallization of copolymers prepared from TMCBD and dihydroxy co-reactants. The reactions disclosed therein do not employ aliphatic haloformates, which in the instant invention are prepared prior to the reaction thereof with an aryl dihydroxy reactant. Otherwise, if an aromatic haloformate is produced instead of forming an aliphatic haloformate, the reaction with an aliphatic diol will not produce a polymer of alternating aliphatic and aromatic species.

SUMMARY OF THE INVENTION

The process of this invention has been developed to produce aliphatic-aromatic co-polycarbonates from their respective aromatic dihydroxy and aliphatic diol monomer components. The process is an interfacial reaction but modified to produce the resulting co-polycarbonate. Generally, the reaction of this invention involves the haloformate of an aliphatic diol such as 2,2,4,4-tetramethyl-1,3-cyclobutanediol and bisphenol-A (BPA). The reaction of this invention first requires forming an aliphatic haloformate as will be subsequently disclosed herein. Otherwise, the reaction will not result in the formation of a copolymer of alternating aliphatic and aromatic units.

DETAILED DESCRIPTION OF THE INVENTION

This invention relates to a novel copolymer comprised of aliphatic and aromatic units in the polymer chain and to a process of reacting an aliphatic haloformate and an aromatic dihydroxy reactant in water and an organic phase at ambient temperature and pressure. The aliphatic haloformate is prepared from an aliphatic diol such as an aliphatic alkyl diol and includes cycloaliphatic, straight and branched chain, diols free of substituent groups which would be reactive with other reactants employed in the reaction system of this invention. The aliphatic diol is preferably a tetraalkylcyclobutanediol. The alkyl groups are those hydrocarbon groups of up to about 8 carbon atoms such as methyl, ethyl, propyl, isopropyl, butyl, isobutyl, t-butyl, pentyl, hexyl, heptyl, 2-ethylhexyl, isooctyl, octyl and the like.

The cycloalkyl group contains preferably 4 to 6 carbon atoms although up to 12 carbon atoms can be used. The cycloalkyl group may be unsubstituted or substituted by a hydrocarbon, a halogen, or the like group, providing that the substituents are not reactive with the other reactants of the reaction system of this invention. Examples of such cycloalkyls include cyclolintyl, 2,2,4,4-tetramethylcyclobutyl, cyclopentyl, cyclohexyl, methylcyclohexyl groups and the like. The preferred aliphatic diol is 2,2,4,4-tetramethyl-1.

The haloformate of the aliphatic diol is formed by reacting an aliphatic diol with a carbonate precursor, preferably a halocarbonyl precursor and more particularly a carbonyl chloride such as phosgene. When employing phosgene, the preferred intermediate reactant formed is 2,2,4,4-tetramethyl-1,3-cyclobutane bischoroformate (TMCBOCl).

A critical feature of this invention is that the haloformate of the aliphatic diol must be formed prior to the reaction thereof with an aromatic dihydroxy diol. If the haloformate of the aliphatic diol is not first formed, then the reaction may result in a copolymer that is not alternating, i.e. 1:1, aliphatic and aromatic units. In addition, another feature of this invention is that the reaction is carried out at a high pH of about 8–14 and preferably about 10 to 14.

As stated previously, the other reactant of this process is an aromatic dihydroxy reactant such as an aromatic dihydric phenol. The dihydric phenols include, but are not limited thereto, 2,2-bis(4-hydroxyphenyl)propane; 2,4'-dihydroxydiphenylmethane; bis(2-hydroxyphenyl)methane; bis(4-hydroxyphenyl)methane; bis(4-hydroxy-5-nitrophenyl)methane; bis(4-hydroxy-2,6-dimethyl-3-methoxypheny)methane; 1,1-bis(4-hydroxyphenyl)ethane; 1,2-bis(4-hydroxyphenyl)ethane; 1,1-bis(4-hydroxy-2-chlorophenyl)ethane; 1,1-bis(2,5-dimethyl-4-hydroxyphenyl)ethane; 1,3-bis(3-methyl-4-hydroxyphenyl)propane; 2,2-bis(3-phenyl-4-hydroxyphenyl)propane; 2,2-bis(3-isopropyl-4-hydroxyphenyl)propane; 2,2-bis(4-hydoxynaphthyl)propane; 2,2-bis(4-hydroxyphenyl)pentane; 3,3-bis(4-hydroxyphenyl)pentane; 2,2-bis(4-hydroxyphenyl)heptane; bis(4-hydroxyphenyl)phenylmethane; bis(4-hydroxyphenyl)cyclohexylmethane; 1,2-bis(4-hydroxyphenyl)-1,2-bis(phenyl)propane; 2,2-bis (4-hydroxyphenyl)-1-phenylpropane; the bisphenol of 4-vinyl cyclohexane; spiro biiidane bisphenol; and the like. Also included are dihydroxybenzenes typified by the hydroquinone and resorcinol, dihydroxydiphenyls such as 4,4'-dihydroxydiphenyl; 2,2'-dihydroxydiphenyl; 2,4'-dihydroxydiphenyl; dihydroxynaphthalenes such as 2,6-dihydroxynaphthalene, and the like, bis-(4-hydroxyphenyl) sulfone; 2,4'-dihydroxydiphenyl sulfone; 5'-chloro-2,4'-dihydroxydiphenyl sulfone; 5'-chloro-2,4'-dihydroxydiphenyl sulfone; 3'-chloro-4,4'-dihydroxydiphenyl sulfone; 4,4'-dihydroxytriphenyl disulfone, etc.; 4,4'-dihydroxydiphenyl ether; 4,4'-dihydroxytriphenyl ether; the 4,3'-, 4,2'-, 4,1'-, 2,2'-, 2,3'-, etc.; dihydroxydiphenyl ethers; 4,4'-dihydroxy-2,6-dimethyldiphenyl ether; 4,4'-dihydroxy-2,5-dimethyldiphenyl ether; 4,4'-dihydroxy-3,3'-dissobutyldiphenyl ether; 4,4'-dihydroxy-3,3'-dissopropyldiphenyl ether; 4,4'-dihydroxy-3,2'-dinitrodiphenyl ether; 4,4'-dihydroxy-3,3'-dichlorodiphenyl ether; 4,4'-dihydroxy-3,3'-difluorodiphenyl ether; 4,4'-dihydroxy-2,3-dibromodiphenyl ether; 4,4'-dihydroxydinaphthyl ether; 4,4'-dihydroxy-3,3'-dichlorodinaphthyl ether; 2,4-dihydroxytetraphenyl ether; 4,4'-dihydroxypentaphenyl ether; 4,4'-dihydroxy-2,6-dimethoxydiphenyl ether; 4,4'-dihydroxy-2,5-diethoxydiphenyl ether, etc. Mixtures of the dihydric phenols can also be employed and where dihydric phenol is mentioned herein, mixtures of such materials are considered to be included.

Preferably the dihydric phenol is a bis(4-hydroxyphenyl) alkane in which the central alkane group contains from 1–8 carbon atoms. Especially preferred dihydric phenols are gem-bis(4-hydroxyphenyl)alkanes in which the central alkylidene group contains from 1–8 carbon atoms. The most preferred dihydric phenol is 2,2-bis(4-hydroxyphenyl) propane (BPA).

The carbonate polymer produced by the process of this invention is a polymer consisting of the residue of the reaction of an aromatic dihydroxy and an aliphatic diol. The residue of the reaction is a copolymer having a ratio of aromatic units to aliphatic units of 1:0.5 to 1:1.5. Preferably, the carbonate polymer consists essentially of a ratio of 1:1 aromatic units to aliphatic units. Through the novel discovery of this invention, aliphatic diols, in particular tetramethylcyclobutanediol (TMCBD) can be incorporated in aromatic polycarbonates by an interfacial polymerization process. The interfacial reaction process of this invention can also result in the formation of co-polycarbonates, ter-polycarbonates and polyester-polycarbonates.

In general, the polycarbonates of this invention can be produced from the polymerization of aliphatic haloformates in the presence of an aromatic dihydroxy reactant such as BPA. Polymerization occurs at ambient temperatures and pressure under relatively high pH condition of 8–14 and preferably 10–14. A catalyst is employed to promote the reaction and high yields may be obtained in 5 minutes by increasing the pH of the reaction. Catalysts that may be employed herein are preferably amine catalysts and particularly triethylamine (TEA). The general synthesis of the carbonate polymer may be as follows:

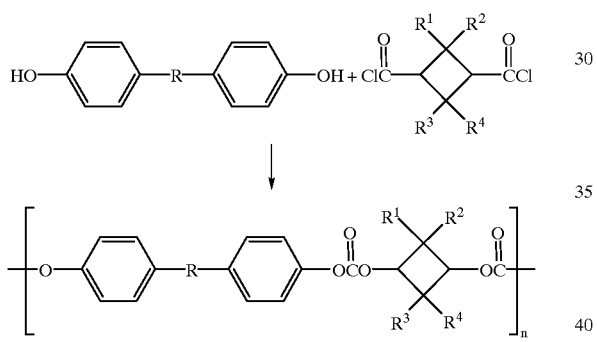

wherein R, $R_1$, $R_2$, $R_3$ and $R_4$ are independently selected from alkyl, aryl or alkylaryl hydrocarbon groups of 1 to 20 carbon atoms and preferably 3–10 carbons atoms, and n is an integer of 5 to 200. R is preferably isopropylidene but may also be acetophenone (bis AP) or spirobiindane (SBI). TMCBOCl is the bischloroformate of tetramethylcyclobutanediol (TMCBD). The reaction can also proceed with two or more aromatic dihydroxy compounds such as isopropylidene and bis AP or bis AP and SBI or even isopropylidene, bis AP and SBI.

DETAILED DESCRIPTION OF THE EXAMPLES

The following examples further exemplify this invention. However, the invention is not limited by these examples.

General Reaction

The copolymers are produced by the reaction of the bischloroformate of tetramethylcyclobutanediol (TMCBOCl) in the presence of bisphenol-A. Polymerization is carried out at ambient temperatures and pressures and at a pH of about 12. A catalytic amount of triethylamine is employed to promote the reaction.

EXAMPLE 1

Formation of 2,2,4,4-tetramethyl-1,3-cyclobutane bischloroformate (TMCBOCl)

To a 1000 ml reactor fitted with a Dewar condenser with dichloromethane (DCM)/acetone bath, a nitrogen/phosgene feed, and a mechanical stirrer, there was charged 400 mls of DCM and 100 g tetramethylcyclobutanediol (TMCBD). This was placed in a dichloromethane (DCM)dry ice bath. The mixture was stirred under a nitrogen blanket to disperse the TMCBD. About 150 g of phosgene (1.5 mol) was then fed into the reactor at the rate of 2 g/min. 115 ml of pyridine (in 100 mls DCM) was dripped into the reactor at about 20 ml/min. The reaction did not appear to be exothermic. The reaction was run for about 2 hours and then was warmed to room temperature. The mixture was extracted into 5 L of hexane, evaporated down to 1 liter, placed in a freezer and crystals which formed were collected.

Nuclear Magnetic Resonance (NMR) confirmed the production of the bischloroformate. The yield was about 75%.

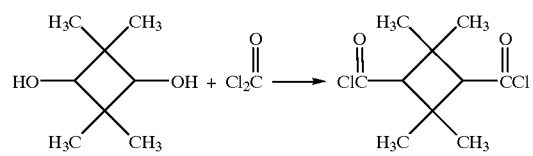

EXAMPLE 2

To a 125 ml flask reactor, 1.77 gms of TMCBOCl prepared in Example 1 above, 1.66 gms of bisphenol A, 50 ml of dichloromethane, 0.2 mls of triethylamine and 25 ml of water were charged. 25 mls of 10% aqueous sodium hydroxide (NaOH) solution was slowly added. The reaction was run for about 15 minutes. The organic layer was then decanted and washed three times in 50 mls of a 10% aqueous hydrochloride (HCl) solution. The organic layer was then poured in 500 mls of methanol and the precipitated polymer was collected and dried under a vacuum.

The yield was over 90% and the polymer was confirmed by NMR.

Reaction

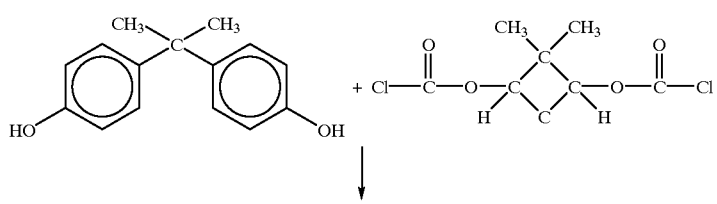

-continued

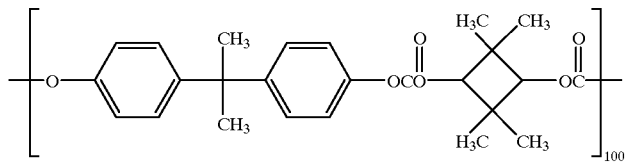

EXAMPLE 3

Example 2 was repeated except that in place of the bisphenol A, spirobiindane dihydroxy phenol was employed herein.

The yield was greater than 90% and the polymer was confirmed by NMR.
Reaction

|  | Mw | MwD | Td (°C.) | Tg (°C.) | NMR* |
|---|---|---|---|---|---|
| Example 2 | 65000 | 3.3 | 383 | 144 | alternating |
| Example 3 | 24000 | 6.3 | 320 | 125 | alternating |
| Example 4 | 26000 | 3.1 | 370 | 170 | alternating |

*Structure, confirmed by NMR
Td-decomposition temperature
Tg-glass transition temperature

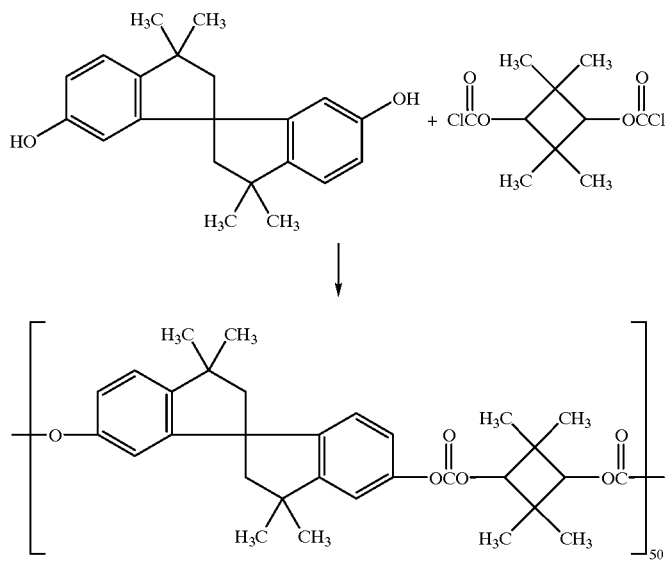

(4)

EXAMPLE 4

Example 2 was repeated except that in place of the bisphenol A, actephenone dihydroxy phenol (Bis AP) was employed herein. The results were essentially the same.

EXAMPLE 5

The copolymer of Example 2 was injection molded at 350° C. into IZOD test bars, which bars were translucent with good dimensional stability.

EXAMPLE 6

The copolymer of Examples 2, 3 and 4 were each separately cast into thin films in a glass dish from a 10 weight % solution of each copolymer in methylene chloride. The films were then removed and dried at 85° C. for about 24 hours. The results were as follows:

While many modifications and variations of the present invention are possible in view of the foregoing specification, it is understood that they would fall within the scope of the appended claims.

What is claimed is:

1. A carbonate copolymer consisting essentially of the residue of the polymerization reaction of one or more aromatic dihydroxy compound and an aliphatic haloformate, said carbonate copolymer having the formula:

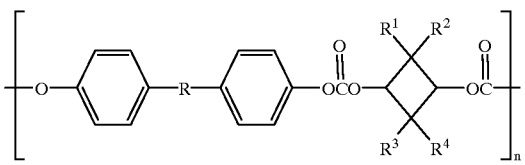

wherein $R_1$, $R_2$, $R_3$, and $R_4$ are independently selected from the group consisting of alkyl, aryl, and alkylaryl hydrocarbons of 1 to 20 carbon atoms, R is selected from the group consisting of alkyl, aryl, and alkylaryl hydrocarbons of 1 to 20 carbon atoms, disubstituted oxygen, sulfone, and spirobiindane, n is an integer of 5–200, and wherein the ratio of aromatic species to aliphatic species is 1:0.5 to 1:1.5.

2. The carbonate polymer of claim 1 wherein R is selected from the group consisting of alkyl groups having from 1–8 carbon atoms, isopropylidene, 1-phenylethyl, spirobiindane and mixtures thereof; and $R_1$, $R_2$, $R_3$, and $R_4$ are each independently hydrocarbons of 3–10 carbon atoms.

3. The carbonate polymer of claim 1 wherein R is elected from the group consisting of alkyl groups having from 1–8 carbon atoms, isopropylidene, 1-phenylethyl, spirobiindane and mixtures thereof.

4. The carbonate polymer of claim 1 wherein $R_1$, $R_2$, $R_3$, and $R_4$ are each independently hydrocarbons of 3–10 carbon atoms.

5. The carbonate polymer of claim 1 wherein the ratio of aromatic species to aliphatic species in the copolymer is about 1:1.

6. The carbonate polymer of claim 5 wherein R is selected from the group consisting of alkyl groups having from 1–8 carbon atoms, isopropylidene, 1-phenylethyl, spirobiindane and mixtures thereof, $R_1$, $R_2$, $R_3$, and $R_4$ are each independently hydrocarbons of 3–10 carbon atoms, and wherein the ratio of aromatic species to aliphatic species in the copolymer is about 1:1.

7. The carbonate polymer of claim 6 wherein $R_1$, $R_2$, $R_3$, and $R_4$ are each methyl groups.

8. A process for preparing a carbonate copolymer by an interfacial polymerization reaction comprising:

reacting an aliphatic diol with a halogen containing carbonate precursor to form an aliphatic haloformate;

reacting the aliphatic haloformate with an aromatic dihydroxy compound in an interfacial polymerization reaction in the presence of an amine at a pH of 8–14 to form a carbonate copolymer consisting essentially of the residue of the aliphatic haloformate and the aromatic dihydroxy compound wherein the ratio of aromatic species to aliphatic species in the copolymer is 1:0.5 to 1:1.5.

9. The process of claim 1, wherein the ratio of aromatic species to aliphatic species in the copolymer is about 1:1.

10. The process of claim 9 wherein the carbonate precursor is phosgene.

11. The process of claim 9 wherein the aromatic dihydroxy compound is selected from the group consisting of an aromatic dihydroxy phenol, an hydroxybenzene, a dihydroxy phenyl, a dihydroxynaphthalene, a bis(hydroxyphenyl)sulfone, a bis(dihydroxyphenyl)ether, and combinations thereof.

12. The process of claim 10 wherein the aliphatic diol is a tetraalkylcyclobutanediol.

13. The process of claim 10 wherein the aromatic dihydroxy compound is selected from the group consisting of a dihydric phenol linked by a hydrocarbon having from 1–8 carbons, bisphenol A, spirobiindane dihydroxyphenol, or acetophenone dihydroxyphenol.

14. The process of claim 9 wherein the aliphatic diol is selected from the group consisting of cycloaliphatic diols, tetraalkylcyclobutanediols wherein the alkyl groups have from 1–8 carbons, and 2,2,4,4,-tetramethyl-1,3-cyclobutanediol.

15. The process of claim 9 wherein the aromatic dihydroxy phenol is 2,2-bis(4dihydroxyphenyl)propane spirobiindane dihydroxyphenol, or acetophenone dihydroxyphenol, and the aliphatic haloformate is 2,2,4,4-tetramethyl-1,3-cyclobutanediol bischloroformate.

16. The process of claim 9 wherein the pH is in the range from 10–14.

* * * * *